US009215026B2

United States Patent
Kishiyama et al.

(10) Patent No.: US 9,215,026 B2
(45) Date of Patent: Dec. 15, 2015

(54) RADIO BASE STATION APPARATUS, MOBILE TERMINAL DEVICE AND WIRELESS COMMUNICATION METHOD

(75) Inventors: Yoshihisa Kishiyama, Tokyo (JP); Kazuaki Takeda, Tokyo (JP); Yusuke Ohwatari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 512 days.

(21) Appl. No.: 13/519,918

(22) PCT Filed: Jan. 5, 2011

(86) PCT No.: PCT/JP2011/050035
§ 371 (c)(1),
(2), (4) Date: Aug. 17, 2012

(87) PCT Pub. No.: WO2011/083794
PCT Pub. Date: Jul. 14, 2011

(65) Prior Publication Data
US 2012/0300653 A1 Nov. 29, 2012

(30) Foreign Application Priority Data

Jan. 5, 2010 (JP) ................................ 2010-000773

(51) Int. Cl.
| | |
|---|---|
| H04J 11/00 | (2006.01) |
| H04W 24/10 | (2009.01) |
| H04L 5/00 | (2006.01) |
| H04L 25/02 | (2006.01) |
| H04L 27/26 | (2006.01) |
| H04W 28/04 | (2009.01) |
| H04W 48/08 | (2009.01) |
| H04W 88/02 | (2009.01) |
| H04W 88/08 | (2009.01) |

(52) U.S. Cl.
CPC ........... *H04J 11/0056* (2013.01); *H04J 11/005* (2013.01); *H04J 11/0053* (2013.01); *H04L 5/0026* (2013.01); *H04L 5/0035* (2013.01);
(Continued)

(58) Field of Classification Search
CPC ... H04W 24/10; H04L 5/0048; H04L 5/0053; H04B 7/0626; H04B 7/024; H04B 7/0632
See application file for complete search history.

(56) References Cited

U.S. PATENT DOCUMENTS

2010/0323684 A1* 12/2010 Cai et al. .................... 455/422.1
2011/0244877 A1* 10/2011 Farajidana et al. ........ 455/452.2
(Continued)

OTHER PUBLICATIONS

Decision to Grant a Patent issued in counterpart Japanese Patent Application No. JP2013-056682, mailed Jul. 22, 2014 (4 pages).
(Continued)

*Primary Examiner* — Jung Park
(74) *Attorney, Agent, or Firm* — Osha Liang LLP (57) ABSTRACT

To provide a radio base station apparatus, mobile terminal device and wireless communication method for transmitting and receiving downlink channel quality measurement reference signals in consideration of orthogonalization among transmission antennas, orthogonalization among cells, and interference estimation of high accuracy, in a wireless communication method of the invention, a radio base station apparatus generates channel quality measurement reference signals, performs randomization processing on the channel quality measurement reference signals to be mutually non-orthogonal among at least a part of cells, and orthogonalizes the channel quality measurement reference signals among transmission antennas to transmit to a mobile terminal device together with control information, and the mobile terminal device receives a downlink signal including the control information and the channel quality measurement reference signal, extracts the channel quality measurement reference signal using the control information, and measures channel quality using the channel quality measurement reference signal.

18 Claims, 8 Drawing Sheets

(52) U.S. Cl.
CPC ............ *H04L 5/0051* (2013.01); *H04L 5/0073* (2013.01); *H04W 24/10* (2013.01); *H04L 5/0028* (2013.01); *H04L 5/0057* (2013.01); *H04L 5/0092* (2013.01); *H04L 25/0226* (2013.01); *H04L 27/2601* (2013.01); *H04W 28/048* (2013.01); *H04W 48/08* (2013.01); *H04W 88/02* (2013.01); *H04W 88/08* (2013.01)

(56) References Cited

U.S. PATENT DOCUMENTS

2011/0317656 A1* 12/2011 Rajih et al. ............... 370/330
2012/0120903 A1* 5/2012 Kim et al. ............... 370/329

OTHER PUBLICATIONS

Notification of Reasons for Rejection w/translation issued for Japanese Patent Application No. 2010-000773, dated Jul. 17, 2012, (5 pages).

Notification of Reasons for Rejection w/translation issued for Japanese Patent Application No. 2010-000773, dated Oct. 23, 2012, (5 pages).

3GPP TS 36.211 V8.8.0, Sep. 2009, "3rd Generation Partnership Project; Technical Specification Group Radio Access Network; Evolved Universal Terrestrial Radio Access (E-UTRA); Physical Channels and Modulation (Release 8)" (83 pages).

A. Nagate et al., "A Study on Resource Allocation Method Considering Inter-Sector Cooperative Transmission," Proceedings of the Society Conference of IEICE, 2009 Nen-Tsushin (1), Sep. 1, 2009, p. 394 (1 page).

Qualcomm Europe, "Details of CSI-RS," 3GPP TSG-RAN WG1#59, R1-094867, Nov. 9, 2009 (6 pages).

Huawei, "Further design and evaluation on CSI-RS for LTE-A," 3GPP TSG RAN WG1 Meeting #59, R1-094704, Nov. 9, 2009 (8 pages).

NTT DOCOMO, "CSI-RS Inter-cell Design Aspects," 3GPP TSG RAN WG1 Meeting #59bis, R1-100498, Jan. 18, 2010 (3 pages).

International Search Report issued in PCT/JP2011/050035, mailed on Feb. 1, 2011, with translation (3 pages).

* cited by examiner

RADIO BASE STATION APPARATUS, MOBILE TERMINAL DEVICE AND WIRELESS COMMUNICATION METHOD

TECHNICAL FIELD

The present invention relates to a radio base station apparatus, mobile terminal device and wireless communication method.

BACKGROUND ART

In LTE (Long Term Evolution) systems specified in the 3GPP ($3^{rd}$ Generation Partnership Project), a reference signal (RS) is arranged in a resource block (RB). For example, a mobile terminal device receives the reference signal, and is thereby capable of performing coherent detection (Non-patent Document 1). The reference signal is scrambled (randomized by a known signal sequence) by a cell-specific scrambling signal.

The 3GPP has studied LTE-A (LTE-Advanced) systems to actualize high-speed transmission in wider coverage than in the LTE system. In the LTE-A system, two types of reference signals (Demodulation Reference Signal (DM-RS) and channel quality measurement reference signal (CSI-RS)) are specified in downlink.

The demodulation reference signal is used in demodulation of the Physical Downlink Shared Channel (PDSCH). The demodulation reference signal is subjected to the same precoding as in the PDSCH and is transmitted to a mobile terminal device. The channel quality measurement reference signal is used in measuring channel quality information (Channel State Indicator) that the mobile terminal device transmits to the radio base station apparatus as feedback.

CITATION LIST

Non-Patent Literature

[Non-patent Literature 1] 3GPP, TS36.211

SUMMARY OF INVENTION

Technical Problems

In the LTE system, to actualize transmission of higher speed, MIMO (Multiple Input Multiple Output) transmission is adopted in which the radio base station apparatus uses a plurality of transmission/reception antennas. In the LTE-A system, since maximum 8-antenna transmission is supported in downlink, it is necessary to consider orthogonalization among transmission antennas in the radio base station apparatus. Further, in the LTE-A system, since Coordinated Multi-Point transmission is performed, it is also necessary to consider orthogonalization among cells. Furthermore, the LTE-A system requires interference estimation with higher accuracy than in the LTE system. Accordingly, in the LTE-A system, it is necessary to design the configuration of the downlink channel quality measurement reference signal so as to satisfy such requirements.

The present invention was made in view of the respect, and it is an object of the invention to provide a radio base station apparatus, mobile terminal device and wireless communication method for transmitting and receiving downlink channel quality measurement reference signals in consideration of orthogonalization among transmission antennas, orthogonalization among cells, and interference estimation of high accuracy.

Solution to the Problems

A radio base station apparatus of the invention is characterized by having transmission signal generating section, having generation section for generating a channel quality measurement reference signal, and randomization section for performing randomization processing on the channel quality measurement reference signal to be mutually non-orthogonal among at least a part of cells, provided corresponding to the number of transmission antennas, and mutually orthogonalizing channel quality measurement reference signals of transmission signals generated in respective transmission signal generating section to transmit on the Physical Downlink Shared Channel.

A mobile terminal device of the invention is characterized by having reception section for receiving a downlink signal including randomization control information and a channel quality measurement reference signal, and section for extracting the channel quality measurement reference signal using the randomization control information, and measuring channel quality using the channel quality measurement reference signal.

A wireless communication method of the invention is characterized by having the steps in a radio base station apparatus of generating channel quality measurement reference signals, performing randomization processing on the channel quality measurement reference signals to be mutually non-orthogonal among at least a part of cells, and orthogonalizing the channel quality measurement reference signals among transmission antennas to transmit to a mobile terminal device together with randomization control information, and the steps in the mobile terminal device of receiving a downlink signal including the randomization control information and the channel quality measurement reference signal, and extracting the channel quality measurement reference signal using the randomization control information, and measuring channel quality using the channel quality measurement reference signal.

Technical Advantages of the Invention

According to the invention, it is possible to transmit and receive downlink channel quality measurement reference signals in consideration of orthogonalization among transmission antennas, orthogonalization among cells, and interference estimation of high accuracy.

DESCRIPTION OF EMBODIMENTS

An Embodiment of the invention will specifically be described below with reference to accompanying drawings.

As described previously, in a radio base station apparatus, since MIMO transmission is adopted in which the apparatus uses a plurality of transmission/reception antennas, it is necessary to perform orthogonalization among transmission antennas in the same cell. The LTE system and LTE-A system are systems in which the frequency is repeated for each cell, and in order for a mobile terminal device at a cell edge to measure reception quality in consideration of interference, randomization (randomizing) should basically be performed. However, to improve characteristics of multi-cell coordinated transmission and inter-cell interference adjustments, it is conceivable that it is desirable to perform orthogonalization among cells involved in multi-cell coordinated transmission and inter-cell interference adjustments.

In consideration of the respects, i.e. orthogonalization among transmission antennas, orthogonalization among cells, and interference estimation of high accuracy, the inventors of the invention studied arrangements of downlink channel quality measurement reference signals and reached completion of the invention.

In other words, it is the gist of the invention to generate channel quality measurement reference signals, perform randomization processing on the channel quality measurement reference signals to be mutually non-orthogonal among at least a part of cells, orthogonalize the channel quality measurement reference signals of transmission signals mutually, and transmit downlink channel quality measurement reference signals in consideration of orthogonalization among transmission antennas, orthogonalization among cells, and interference estimation of high accuracy.

Accordingly, it is conceivable that it is desirable to transmit the channel quality measurement reference signals (CSI-RSs) in the following two states.

1) Orthogonalization among transmission antennas, randomization among cells

2) Orthogonalization among transmission antennas, combination of randomization/orthogonalization among cells Herein, in the state of (2), cells to orthogonalize are cells involved in multi-cell coordinated transmission and inter-cell interference adjustments.

Figure 1:
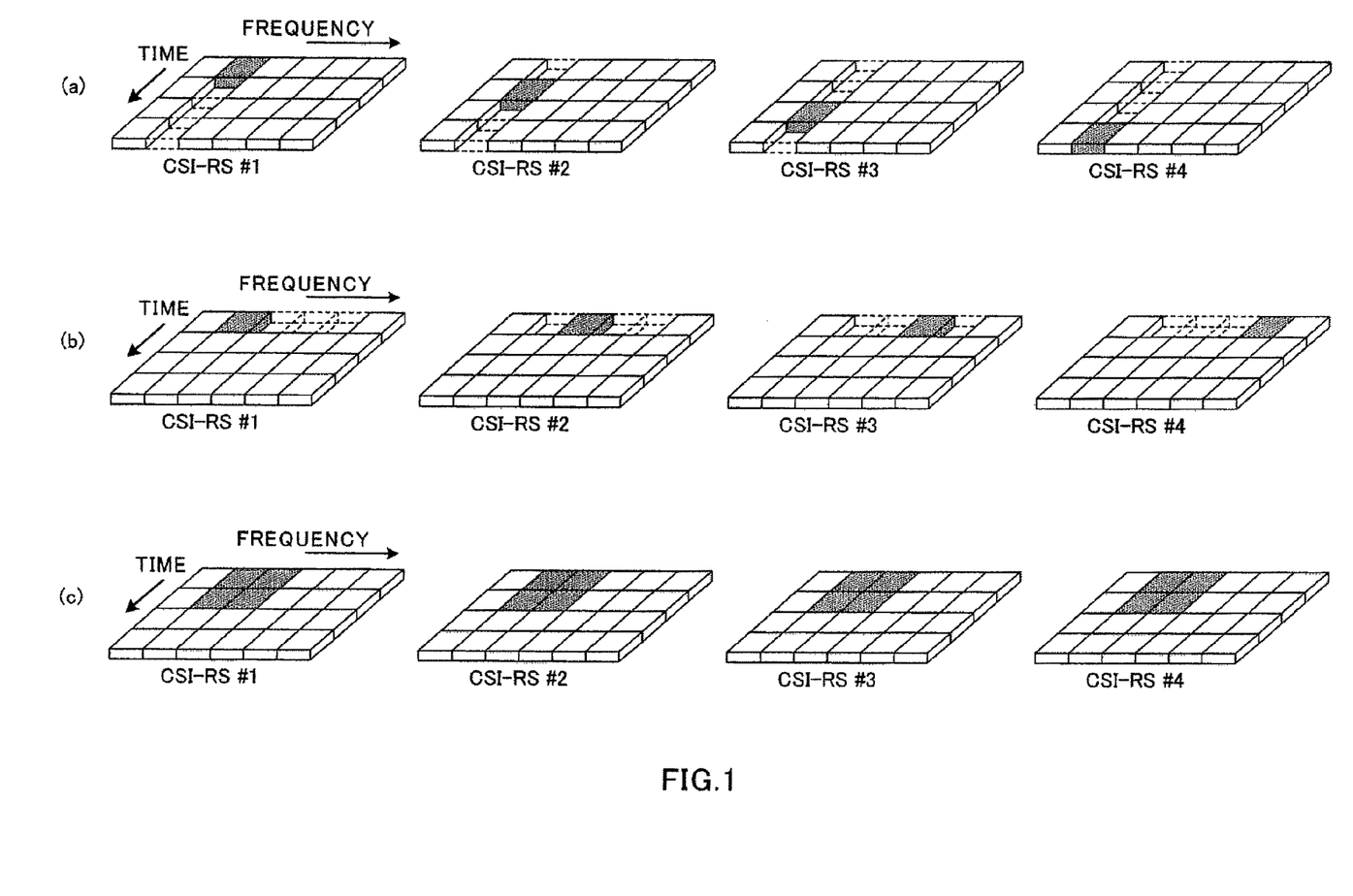
FIGS. 1(a) to 1(c) are diagrams to explain orthogonalization of CSI-RSs in an Embodiment of the invention.

Described first is a method of orthogonalizing CSI-RSs among transmission antennas and a part of cells. As the method (orthogonalization processing) of orthogonalizing CSI-RSs, there are methods of time division multiplexing, frequency division multiplexing and code division multiplexing as shown in FIGS. 1(a) to 1(c). Each of these methods may be adopted individually, or two methods or more may be combined.

FIG. 1(a) is a diagram illustrating the case of performing time division multiplexing (TDM) on CSI-RSs. In time division multiplexing, a plurality of CSI-RSs is multiplexed using different OFDM symbols, and the other data is punctured so that the CSI-RSs do not interfere with the data. In FIG. 1(a), a CSI-RS to transmit with a transmission antenna (or cell) #1 is arranged in a backmost OFDM symbol in a second subcarrier from the left, and the other OFDM symbols (OFDM symbols into which CSI-RSs to transmit with the other transmission antennas are multiplexed) in the second subcarrier from the left are punctured. Further, a CSI-RS to transmit with a transmission antenna (or cell) #2 is arranged in a second backmost OFDM symbol in the second subcarrier from the left, and the other OFDM symbols (OFDM symbols into which CSI-RSs to transmit with the other transmission antennas are multiplexed) in the second subcarrier from the left are punctured. Furthermore, a CSI-RS to transmit with a transmission antenna (or cell) #3 is arranged in a third backmost OFDM symbol in the second subcarrier from the left, and the other OFDM symbols (OFDM symbols into which CSI-RSs to transmit with the other transmission antennas are multiplexed) in the second subcarrier from the left are punctured. Still furthermore, a CSI-RS to transmit with a transmission antenna (or cell) #4 is arranged in a front OFDM symbol in the second subcarrier from the left, and the other OFDM symbols (OFDM symbols into which CSI-RSs to transmit with the other transmission antennas are multiplexed) in the second subcarrier from the left are punctured. By thus mapping the CSI-RS in each layer, the CSI-RSs are orthogonalized among the transmission antennas, and do not interfere with the other data. In addition, the puncture processing is desirable processing, and is not essential processing.

FIG. 1(b) is a diagram illustrating the case of performing frequency division multiplexing (FDM) on CSI-RSs. In frequency division multiplexing, a plurality of CSI-RSs is multiplexed using different subcarriers, and the other data is punctured so that the CSI-RSs do not interfere with the data. In FIG. 1(b), a CSI-RS to transmit with the transmission antenna (or cell) #1 is arranged in the backmost OFDM symbol in the second subcarrier from the left, and backmost OFDM symbols (OFDM symbols into which CSI-RSs to transmit with the other transmission antennas are multiplexed) in the other subcarriers are punctured. Further, a CSI-RS to transmit with the transmission antenna (or cell) #2 is arranged in a backmost OFDM symbol in a third subcarrier from the left, and backmost OFDM symbols (OFDM symbols into which CSI-RSs to transmit with the other transmission antennas are multiplexed) in the other subcarriers are punctured. Furthermore, a CSI-RS to transmit with the transmission antenna (or cell) #3 is arranged in a backmost OFDM symbol in a fourth subcarrier from the left, and backmost OFDM symbols (OFDM symbols into which CSI-RSs to transmit with the other transmission antennas are multiplexed) in the other subcarriers are punctured. Still furthermore, a CSI-RS to transmit with the transmission antenna (or cell) #4 is arranged in a backmost OFDM symbol in a fifth subcarrier from the left, and backmost OFDM symbols (OFDM symbols into which CSI-RSs to transmit with the other transmission antennas are multiplexed) in the other subcarriers are punctured. By thus mapping the CSI-RS in each layer, the CSI-RSs are orthogonalized among the transmission antennas, and do not interfere with the other data. In addition, the puncture processing is desirable processing, and is not essential processing.

FIG. 1(c) is a diagram illustrating the case of performing code division multiplexing (CDM) on CSI-RSs. In code division multiplexing, a plurality of CSI-RSs is arranged in the same OFDM symbols in the time/frequency domain and is multiplexed using orthogonal codes among transmission antennas (or cells). In FIG. 1(c), CSI-RSs to transmit with transmission antennas (or cells) #1 to #4 are arranged in four OFDM symbols, two OFDM symbols from the back in the second subcarrier from the left and two OFDM symbols from the back in the third subcarrier from the left, and are orthogonalized among the transmission antennas using orthogonal codes. In this case, the other OFDM symbols are not punctured. These four OFDM symbols are orthogonalized with orthogonal codes, and therefore, the CSI-RSs are orthogonalized among the transmission antennas. As the orthogonal codes, there are Walsh codes and the like.

It is possible to combine the orthogonalization methods (TDM, FDM, CDM) as appropriate to use. In this case, a plurality of CSI-RSs is arranged in different OFDM symbols and/or subcarriers to perform time multiplexing and/or frequency multiplexing, and is further orthogonalized among the transmission antennas using orthogonal codes.

Figure 2:
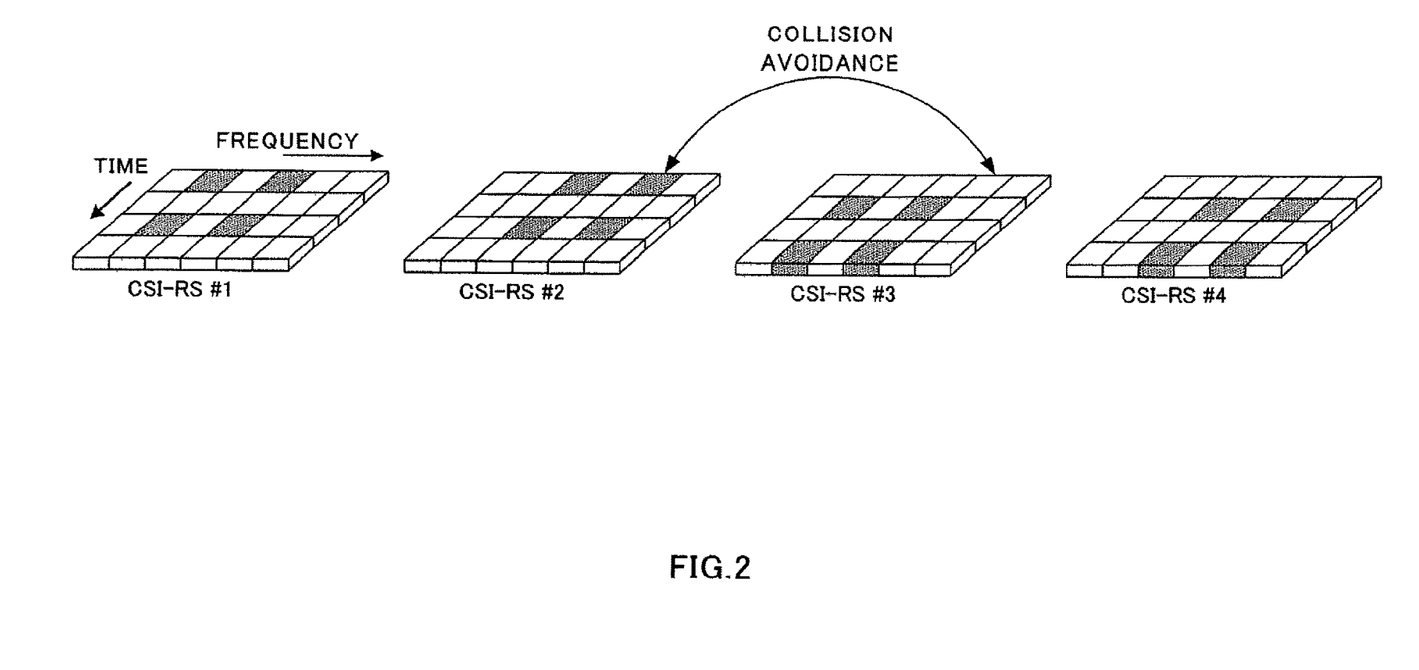
FIG. 2 is a diagram to explain randomization of CSI-RSs by shifting.
Figure 3:
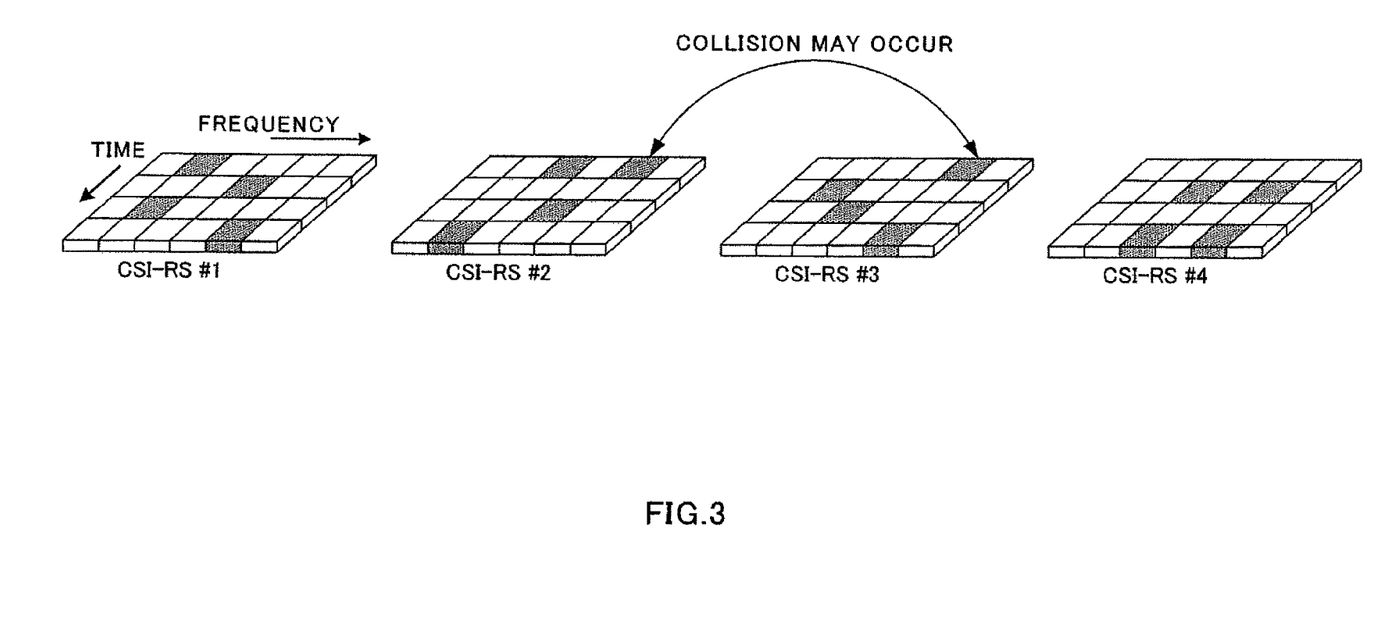
FIG. 3 is a diagram to explain randomization of CSI-RSs by hopping.
Figure 4:
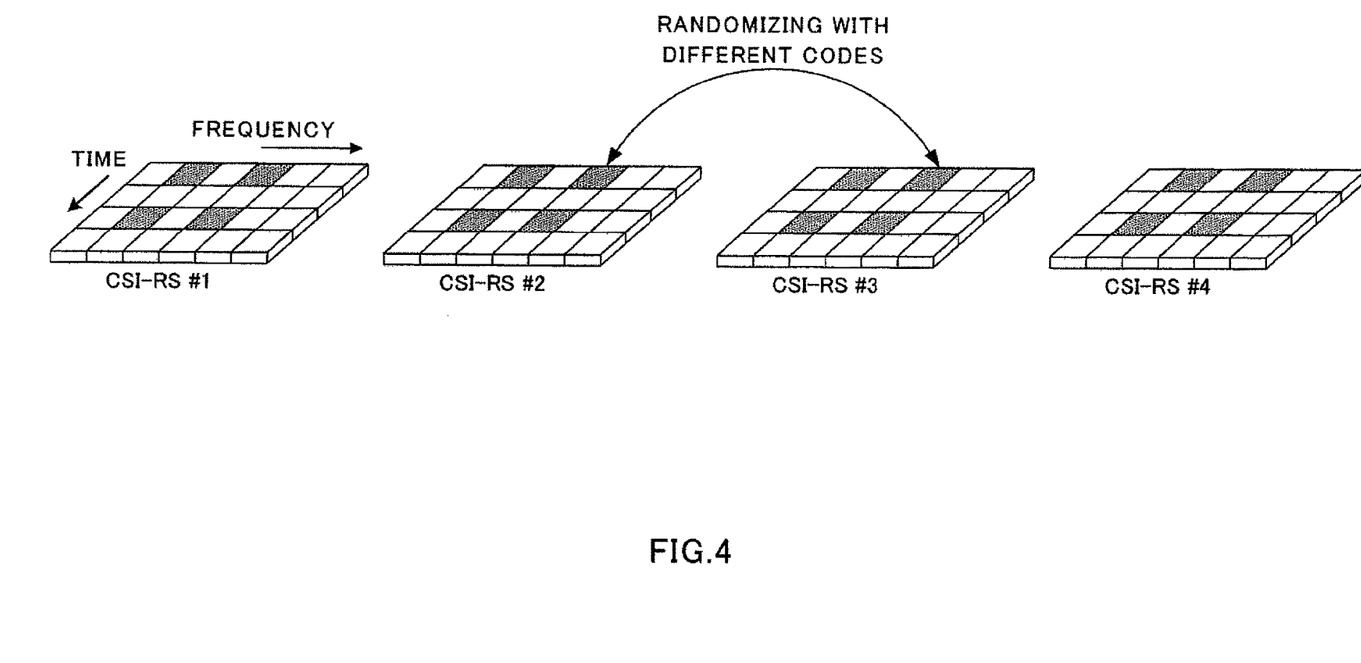
FIG. 4 is a diagram to explain randomization of CSI-RSs by scrambling.

Described next is a method of randomizing (randomizing) CSI-RSs among cells. As the method (randomization processing) of randomizing CSI-RSs, there are methods of shifting, hopping and scrambling as shown in FIGS. 2 to 4. Each of these methods may be adopted individually, or two methods or more may be combined. FIG. 2 is a diagram to explain randomization of CSI-RSs by shifting. In shifting, each CSI-RS is mapped not to collide (not to interfere) in the time domain and the frequency domain. In FIG. 2, CSI-RSs to transmit in a cell #1 are arranged in the first and third OFDM symbols from the back in the second subcarrier from the left and the fourth subcarrier from the left. Further, CSI-RSs to transmit in a cell #2 are arranged in the first and third OFDM symbols from the back in the third subcarrier from the left and a fifth subcarrier from the left. Furthermore, CSI-RSs to transmit in a cell #3 are arranged in the second and fourth OFDM symbols from the back in the second subcarrier from the left and the fourth subcarrier from the left. Moreover, CSI-RSs to transmit in a cell #4 are arranged in the second and fourth OFDM symbols from the back in the third subcarrier from the left and the fifth subcarrier from the left. In this way, collisions of CSI-RSs among cells are avoided. In this case, the puncture processing is not performed on OFDM symbols.

When CSI-RSs are thus mapped, the CSI-RS interferes with data symbols of the other cells, and it is thereby possible to measure power of the data symbols of the other cells. Accordingly, this method is a method with high interference estimation accuracy.

FIG. 3 is a diagram to explain randomization of CSI-RSs by hopping. In hopping, each CSI-RS is mapped randomly (pseudo random) in the time domain and the frequency domain. In FIG. 3, CSI-RSs to transmit in the cell #1 are arranged in the backmost OFDM symbol and third OFDM symbol from the back in the second subcarrier from the left, the second OFDM symbol from the back in the fourth subcarrier from the left, and the front OFDM symbol in the fifth subcarrier from the left. Further, CSI-RSs to transmit in the cell #2 are arranged in the front OFDM symbol in the second subcarrier from the left, the backmost symbol in the third subcarrier from the left, the second OFDM symbol from the front in the fourth subcarrier from the left, and the backmost OFDM symbol in the fifth subcarrier from the left. Furthermore, CSI-RSs to transmit in the cell #3 are arranged in the second OFDM symbol from the back in the second subcarrier from the left, the third OFDM symbol from the back in the third subcarrier from the left, and the backmost and front OFDM symbols in the fifth subcarrier from the left. Still furthermore, CSI-RSs to transmit in the cell #4 are arranged in the second OFDM symbol from the back and the front OFDM symbol in the third subcarrier from the left, and the second OFDM symbol from the back and the front OFDM symbol in the fifth subcarrier from the left. In this way, arrangements of CSI-RSs among cells are randomized. In this hopping, there is the case that the CSI-RS transmitted in the cell #2 collides with the CSI-RS transmitted in the cell #3 in FIG. 3. Also in this case, the puncture processing is not performed on the OFDM symbols.

In such mapping, since the CSI-RSs are arranged randomly, the number of arrangement patterns is high. Therefore, it is possible to increase the number of cell repetitions as compared with shifting.

FIG. 4 is a diagram to explain randomization of CSI-RSs by scrambling. In scrambling, each CSI-RS is arranged in the same OFDM symbol in the time/frequency domains, is multiplied by a non-orthogonal code (scrambling code) varying with the cells. In FIG. 4, CSI-RSs to transmit in the cell #1 are arranged in the backmost OFDM symbol and the third OFDM symbol from the back in the second subcarrier from the left, and the backmost OFDM symbol and the third OFDM symbol from the back in the fourth subcarrier from the left, and are non-orthogonalized among the cells using different scrambling codes. In this case, the other OFDM symbols are not punctured. These four OFDM symbols are randomized with different non-orthogonal codes, and therefore, the CSI-RSs are non-orthogonalized among the cells.

It is possible to combine scrambling with shifting and hopping with ease. In other words, it is possible to combine shifting and scrambling by performing shifting so that CSI-RSs are arranged in different OFDM symbols among cells, and multiplying by scrambling codes varying with the cells, it is possible to combine hopping and scrambling by performing hopping so that CSI-RSs are arranged in different OFDM symbols among cells, and multiplying by scrambling codes varying with the cells, and it is possible to combine shifting, hopping and scrambling by performing shifting and hopping so that CSI-RSs are arranged in different OFDM symbols among cells, and multiplying by scrambling codes varying with the cells. To avoid collisions of CSI-RSs among cells and increase the number of cell repetitions, it is desirable to adopt the combination of shifting and scrambling. In addition, randomization may be performed by performing shifting and hopping so that CSI-RSs are arranged in different OFDM symbols among the cells.

In the case of performing randomization among the cells, or combining randomization/orthogonalization among the cells, control signaling is needed. For example, the shifting number (shifting identification information) indicative of a shifting pattern is signaled in the case of shifting, the hopping number (hopping identification information) indicative of a hopping pattern is signaled in the case of hopping, and a scrambling code is signaled in the case of scrambling. Herein, the scrambling code number, the shifting number and the hopping number are referred to as randomization control information.

In the invention, among a part of cells, e.g. cells involved in multi-cell coordinated transmission or interference adjustments, it is necessary to orthogonalize CSI-RSs. In this case, it is necessary to signal orthogonalization control information. The orthogonalization control information includes resources to use and the number of orthogonal multiplexing (orthogonal resource number (orthogonal resource identification information)).

The randomization control information and orthogonalization control information may be broadcast as common control information, or may be notified as dedicated control information. Further, it is possible to reduce the number of bits required for the control information by associating with the cell ID.

Described herein are combinations of randomization/orthogonalization among the cells. FIG. 5(a) is a diagram illustrating a cell configuration, and FIG. 5(b) is a diagram illustrating a combination example of orthogonalization and randomization. In addition, the aspect as shown in FIG. 5(b) is an aspect of a combination of orthogonalization by FDM and randomization by shifting. The invention is not limited to this aspect, and includes aspects of combinations of orthogonalization by FDM and randomization by shifting, and other orthogonalization methods and other randomization methods.

The cell configuration as shown in FIG. 5(a) is a cell configuration having four cell groups each with the number of orthogonal multiplexing being "3". In other words, this cell configuration is a cell configuration having cell groups 1 to 4 in which the number of orthogonal multiplexing is "3" (A to C). In such a cell configuration, orthogonalization is performed among a part of cells, randomization is performed among the other cells, and entire interference is randomized.

As shown in FIG. 5(b), randomization is performed among the cell groups (1 to 4), and orthogonalization is performed among cells (A to C) in the cell groups. In other words, among the cell 1A, cell 1B and cell 1C, a plurality of CSI-RSs is multiplexed using different subcarriers, the other data is punctured so that the CSI-RSs do not mutually interfere with the data, and orthogonalization is thereby performed. Similarly, also among the cell 2A, cell 2B and cell 2C, a plurality of CSI-RSs is multiplexed using different subcarriers, the other data is punctured so that the CSI-RSs do not mutually interfere with the data, and orthogonalization is thereby performed. Similarly, also among the cell 3A, cell 3B and cell 3C, a plurality of CSI-RSs is multiplexed using different subcarriers, the other data is punctured so that the CSI-RSs do not mutually interfere with the data, and orthogonalization is thereby performed. Similarly, also among the cell 4A, cell 4B and cell 4C, a plurality of CSI-RSs is multiplexed using different subcarriers, the other data is punctured so that the CSI-RSs do not mutually interfere with the data, and orthogonalization is thereby performed.

Meanwhile, among the cell 1A, cell 2A, cell 3A and cell 4A, each CSI-RS is mapped not to collide (not to interfere) in the time domain and the frequency domain. Similarly, also among the cell 1B, cell 2B, cell 3B and cell 4B, each CSI-RS is mapped not to collide (not to interfere) in the time domain and the frequency domain. Similarly, also among the cell 1C, cell 2C, cell 3C and cell 4C, each CSI-RS is mapped not to collide (not to interfere) in the time domain and the frequency domain.

Thus, the randomization processing is performed on CSI-RSs so that the CSI-RSs are non-orthogonal among at least a part of the cells. Further, CSI-RSs of signals to transmit with respective transmission antennas are mutually orthogonalized. By the radio base station apparatus performing such processing, it is possible to actualize the transmission aspect for performing orthogonalization among the transmission antennas, while performing randomization among the cells, or the aspect for performing orthogonalization among the transmission antennas, while performing a combination of randomization/orthogonalization among the cells. As a result, it is possible to transmit and receive downlink channel quality measurement reference signals in consideration of orthogonalization among transmission antennas, orthogonalization among cells, and interference estimation of high accuracy.

Figure 6:
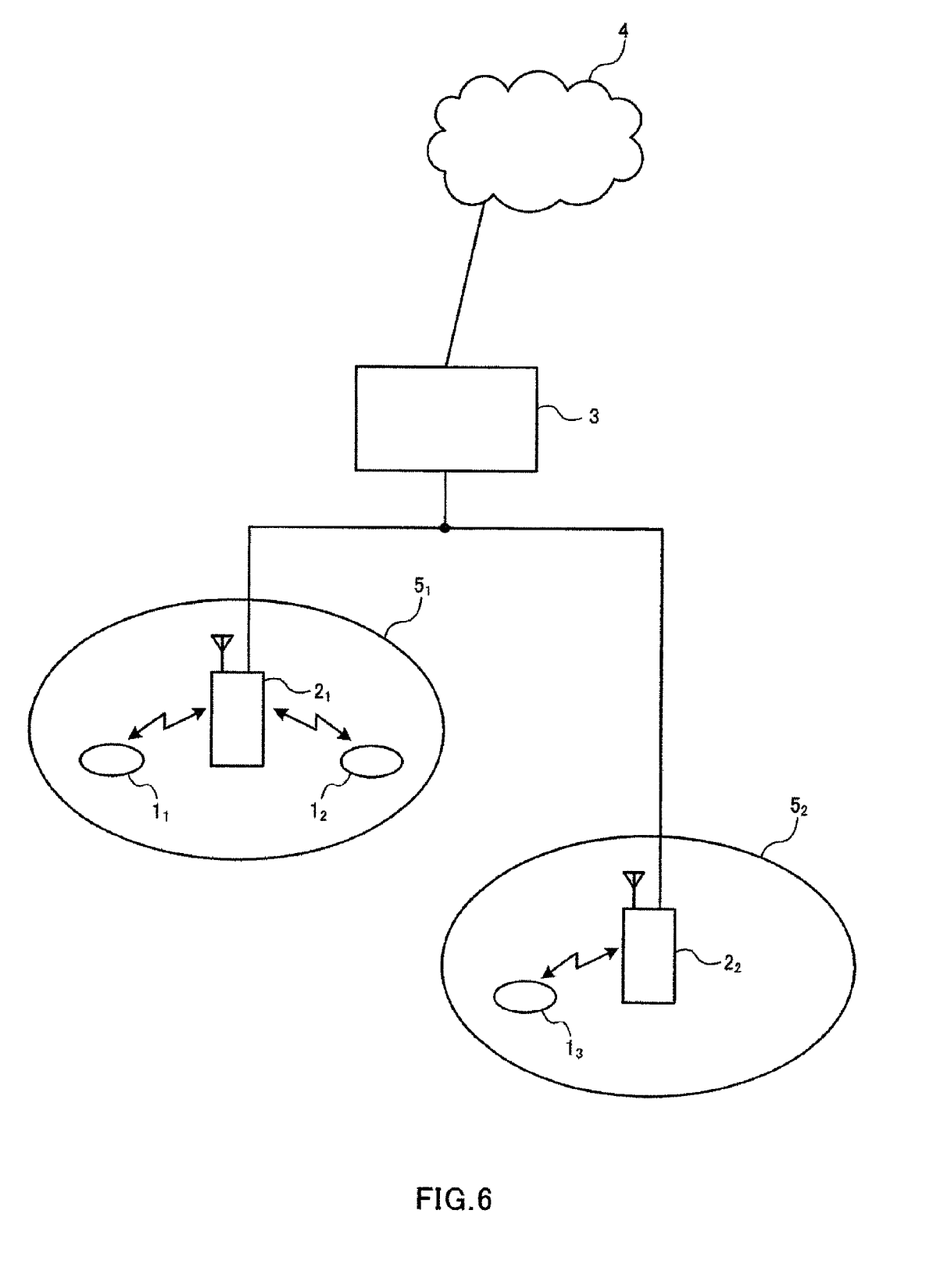
FIG. 6 is a diagram illustrating a wireless communication system having radio base station apparatuses and mobile terminal devices according to the Embodiment of the invention.

FIG. 6 is a diagram illustrating a wireless communication system having the radio base station apparatus and the mobile terminal device according to the Embodiment of the invention.

The wireless communication system is a system to which, for example, E-UTRA (Evolved UTRA and UTRAN) is applied. The wireless communication system is provided with base station apparatuses (eNB: eNodeB) $2$ ($2_1, 2_2, \ldots, 2_l$, l is an integer where l>0) and a plurality of mobile terminal devices (UE) $1_n$ ($1_1, 1_2, 1_3, \ldots, 1_n$, n is an integer where n>0) that communicate with the radio base station apparatuses 2. The radio base station apparatuses 2 are connected to an upper station, for example, an access gateway apparatus 3, and the access gateway apparatus 3 is connected to a core network 4. The mobile terminal $1_n$ communicates with the radio base station apparatus 2 in a cell 5 ($5_1, 5_2$) by E-UTRA. This Embodiment shows two cells, but the invention is similarly applicable to three cells or more. In addition, each of the mobile terminal devices ($1_1, 1_2, 1_3, \ldots, 1_n$) has the same configuration, function and state, and is described as a mobile terminal device $1_n$ unless otherwise specified in the following description.

In the wireless communication system, as a radio access scheme, OFDM (Orthogonal Frequency Division Multiplexing) is applied in downlink, while SC-FDMA (Single-Carrier Frequency Division Multiple Access) is applied in uplink. Herein, OFDM is a multicarrier transmission scheme for dividing a frequency band into a plurality of narrow frequency bands (subcarriers), and mapping data to each subcarrier to perform communication. SC-FDMA is a single-carrier transmission scheme for dividing a frequency band for each terminal so that a plurality of terminals uses mutually different frequency bands, and thereby reducing interference among the terminals.

Described herein are communication channels in E-UTRA.

In downlink, used are the Physical Downlink Shared Channel (PDSCH) shared among the mobile terminal devices $1_n$, and the Physical Downlink Control Channel (PDCCH). The Physical Downlink Control Channel is also called the downlink L1/L2 control channel. User data i.e. normal data signals are transmitted on the Physical Downlink Shared Channel. Meanwhile, on the Physical Downlink Control Channel are transmitted downlink scheduling information (DL Scheduling Information), acknowledgement/negative acknowledgement information (ACK/NACK), uplink scheduling grant (UL Scheduling Grant), TPC command (Transmission Power Control Command), etc. For example, the downlink scheduling information includes an ID of a user to perform communications using the Physical Downlink Shared Channel, information of a transport format of the user data, i.e. information on the data size, modulation scheme, and retransmission control (HARQ: Hybrid ARQ), downlink resource block assignment information, etc.

Meanwhile, for example, the uplink scheduling grant includes an ID of a user to perform communications using the Physical Uplink Shared Channel, information of a transport format of the user data, i.e. information on the data size and modulation scheme, uplink resource block assignment information, information on transmission power of the uplink shared channel, etc. Herein, the uplink resource block corresponds to frequency resources, and is also called the resource unit.

Further, the acknowledgement/negative acknowledgement information (ACK/NACK) is acknowledgement/negative acknowledgement information concerning the shared channel in uplink. The content of acknowledgement/negative acknowledgement information is expressed by Acknowledgement (ACK) indicating that the transmission signal is properly received or Negative Acknowledgement (NACK) indicating that the transmission signal is not properly received.

In uplink, used are the Physical Uplink Shared Channel (PUSCH) shared among the mobile terminal devices $1_n$, and the Physical Uplink Control Channel (PUCCH). User data i.e. normal data signals are transmitted on the Physical Uplink Shared Channel. Meanwhile, on the Physical Uplink Control Channel is transmitted downlink quality information used in scheduling processing of the physical shared channel in downlink and adaptive modulation/demodulation and coding processing, and acknowledgement/negative acknowledgement information of the Physical Downlink Shared Channel.

On the Physical Uplink Control Channel, a scheduling request to request resource allocation of the uplink shared channel, release request in persistent scheduling and the like may be transmitted, in addition the CQI and acknowledgement/negative acknowledgement information. Herein, resource allocation of the uplink shared channel section that a radio base station apparatus notifies a mobile terminal device that the mobile terminal device is allowed to perform communications using an uplink shared channel in a subsequent subframe, using the Physical Downlink Control Channel in some subframe.

The mobile terminal device $1_n$ communicates with an optimal radio base station apparatus. In the example of FIG. 6, mobile terminal devices $1_1$ and $1_2$ communicate with a radio base station apparatus $2_1$, and a mobile terminal device $1_3$ communicates with a radio base station apparatus $2_2$.

Figure 7:
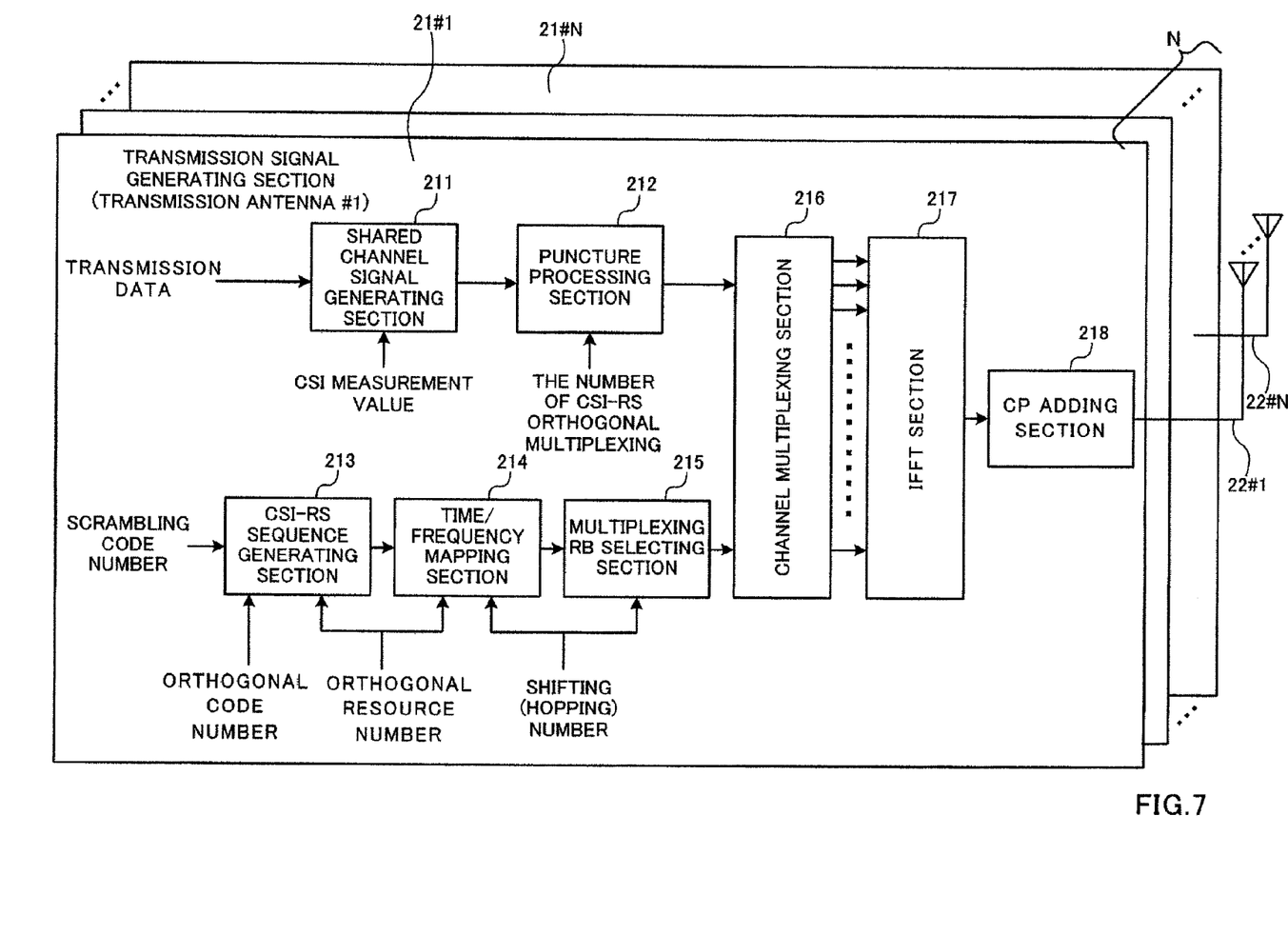
FIG. 7 is a block diagram illustrating a schematic configuration of the radio base station apparatus according to the Embodiment of the invention.

FIG. 7 is a diagram illustrating a configuration of the radio base station apparatus according to the Embodiment of the invention. FIG. 7 illustrates only the transmission section, but as a matter of course, the radio base station apparatus is provided with the reception section for performing reception processing on uplink signals.

The radio base station apparatus as shown in FIG. 7 is provided with a plurality of transmission antennas 22#1 to 22#N, and transmission signal generating sections 21#1 to 21#N provided in association with the transmission antennas. Each of the transmission signal generating sections 21 is mainly comprised of a shared channel signal generating section 211 that generates a shared channel signal, a puncture processing section 212 that performs puncture processing on a shared channel signal, a CSI-RS sequence generating section 213 that generates a CSI-RS sequence, a time/frequency mapping section 214 that maps the CSI-RS in the time domain/frequency domain, a multiplexing RB selecting section 215 that selects a resource block (RB) to perform shifting and/or hopping on the CSI-RS, a channel multiplexing section 216 that multiplexes the shared channel signal and a signal including the CSI-RS, an IFFT (Inverse Fast Fourier Transform) section 217 that performs IFFT on the multiplexed signal, and a CP (Cyclic Prefix) adding section 218 that adds a CP to the IFFT-processed signal. In addition, the transmission signal generating sections 21#1 to 21#N are provided corresponding to the number of transmission antennas 22#1 to 22#N, and FIG. 7 shows specifically only the transmission signal generating section 21#1 of the transmission antenna #1.

The shared channel signal generating section 211 generates a shared channel signal (signal transmitted on the PDSCH) using downlink transmission data. The shared channel signal generating section 211 generates the shared channel signal based on a CSI measurement value measured in the radio base station apparatus using a CSI-RS included in an uplink signal. The shared channel signal generating section 211 outputs the generated shared channel signal to the puncture processing section 212.

Figure 5:
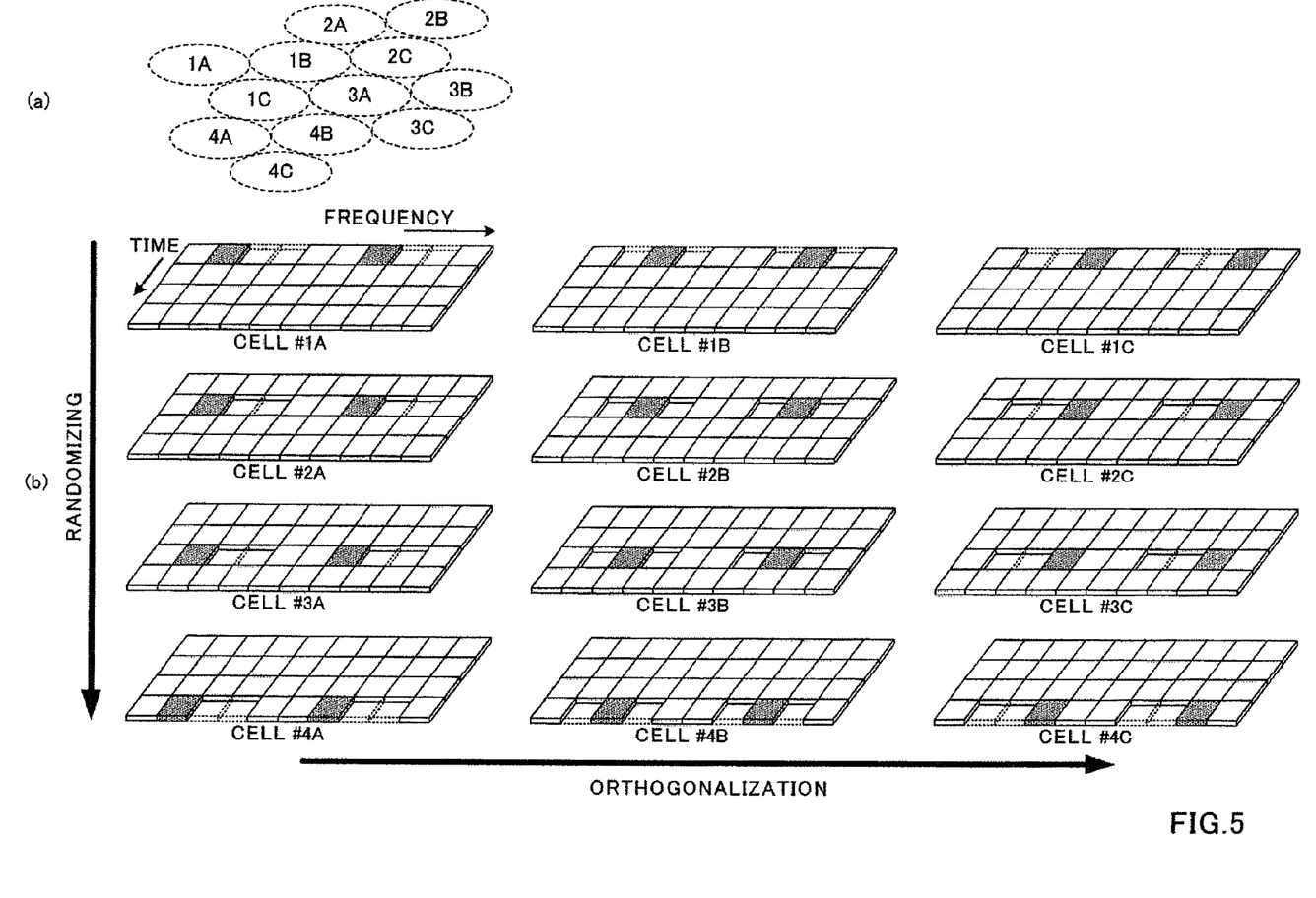
FIG. 5(a) is a diagram illustrating a cell configuration.
FIG. 5(b) is a diagram illustrating a combination example of orthogonalization and randomization.

The puncture processing section 212 performs puncture processing on the generated shared channel signal. As shown in FIGS. 1(a), 1(b), and 5(b), the puncture processing is performed on the shared channel signal so that the CSI-RS arranged in the RB does not interfere with the shared channel signal (transmission data) among the transmission antennas and a part of the cells. The puncture processing section 212 of each of the transmission signal generating sections 21#1 to 21#N performs the puncture processing on the shared channel signal based on the number of CSI-RS orthogonal multiplexing ("3" of A to C in the case as shown in FIG. 5) included in the orthogonal resource information (orthogonal resource number). In other words, the puncture processing section 212 performs the puncture processing on the shared channel signal so that the CSI-RS does not interfere with the shared channel signal (transmission data) among the cells and the transmission antennas based on the number of CSI-RS orthogonal multiplexing. The puncture processing section 212 outputs the shared channel signal subjected to the puncture processing to the channel multiplexing section 216.

The CSI-RS sequence generating section 213 generates the CSI-RS to multiplex into an RB. In the case of scrambling the CSI-RS as the randomization processing, as shown in FIG. 4, the CSI-RS sequence generating section 213 scrambles the CSI-RS with a scrambling code based on the scrambling code number. Further, in the case of performing code multiplexing as the orthogonalization processing, as shown in FIG. 1(c), the CSI-RS sequence generating section 213 orthogonalizes the CSI-RSs using an orthogonal code based on the orthogonal code number and the number of orthogonal multiplexing included in the orthogonal resource number, among the transmission antennas and cells to orthogonalize. The CSI-RS sequence generating section 213 outputs the CSI-RS to the time/frequency mapping section 214.

The time/frequency mapping section 214 maps the CSI-RS to the time domain/frequency domain in the RB. In the case of performing time multiplexing and/or frequency multiplexing as the orthogonalization processing, as shown in FIGS. 1(a) and 1(b), the time/frequency mapping section 214 orthogonalizes the CSI-RSs using the number of orthogonal multiplexing included in the orthogonal resource number. Meanwhile, in the case of performing shifting and/or hopping as the randomization processing, the time/frequency mapping section 214 performs shifting and/or hopping on the CSI-RSs based on the shifting number and/or the hopping number. The time/frequency mapping section 214 outputs the mapped signal to the multiplexing RB selecting section 215.

The multiplexing RB selecting section 215 selects an RB of a radio frame to multiplex. In the case of performing shifting and/or hopping as the randomization processing, the multiplexing RB selecting section 215 selects an RB of a radio frame to multiplex the signal including the CSI-RS based on the shifting number and/or the hopping number. The multiplexing RB selecting section 215 outputs the signal including the CSI-RS with the RB selected to the channel multiplexing section 216.

The channel multiplexing section 216 performs channel multiplexing on the shared channel signal and the signal including the CSI-RS. The channel multiplexing section 216 outputs the channel-multiplexed signal to the IFFT section 217. The IFFT section 217 performs IFFT on the channel-multiplexed signal to transform into the signal in the time domain. The IFFT section 217 outputs the IFFT-processed signal to the CP adding section 218. The CP adding section 218 adds a CP to the IFFT-processed signal. The signal provided with the CP in each of the transmission signal generating sections 21#1 to 21#N is transmitted to each mobile terminal device from respective one of the transmission antennas 22#1 to 2244N in downlink (Physical Downlink Shared Channel).

In the radio base station apparatus with the aforementioned configuration, in performing orthogonalization among the transmission antennas and/or cells, when time multiplexing and/or frequency multiplexing is used as the orthogonalization processing, the time/frequency mapping section 214 performs the orthogonalization processing. Meanwhile, in performing orthogonalization among the transmission antennas and/or cells, when code multiplexing is used as the orthogonalization processing, the CSI-RS sequence generating section 213 performs the orthogonalization processing. Further, in performing orthogonalization among the transmission antennas and/or cells, when code multiplexing, time multiplexing and/or frequency multiplexing is used as the orthogonalization processing, the time/frequency mapping section 214 and CSI-RS sequence generating section 213 perform the orthogonalization processing.

Meanwhile, in performing randomization among the cells, when shifting and/or hopping is used as the randomization processing, the time/frequency mapping section 214 and multiplexing RB selecting section 215 perform the randomization processing. Meanwhile, in performing randomization among the cells, when scrambling is used as the randomization processing, the CSI-RS sequence generating section 213 performs the randomization processing. Further, in performing randomization among the cells, when scrambling, shifting and/or hopping is used as the randomization processing, the CSI-RS sequence generating section 213, time/frequency mapping section 214, and multiplexing RB selecting section 215 perform the randomization processing.

Figure 8:
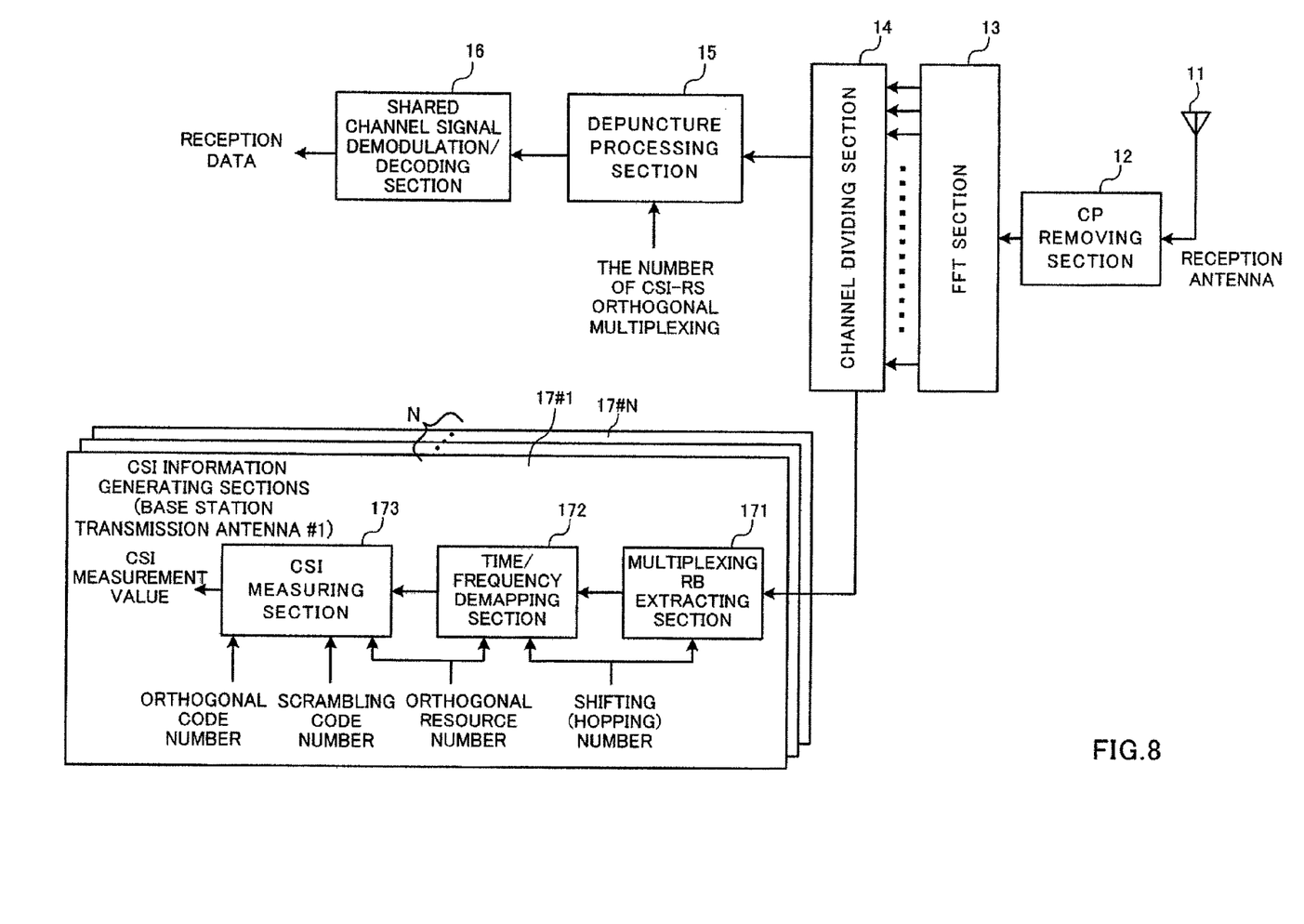
FIG. 8 is a block diagram illustrating a schematic configuration of the mobile terminal device according to the Embodiment of the invention.

FIG. 8 is a diagram illustrating a configuration of the mobile terminal device according to the Embodiment of the invention. The mobile terminal device as shown in FIG. 8 is mainly comprised of a reception antenna 11, a CP removing section 12 that removes a CP from a reception signal, an FFT (Fast Fourier Transform) section 13 that performs FFT on the CP-removed signal, a channel dividing section 14 that divides into a shared channel signal and a signal including the CSI-RS, a depuncture processing section 15 that performs depuncture processing on the shared channel signal, a shared channel signal demodulation/decoding section 16 that demodulates and decodes the shared channel signal subjected to the depuncture processing, and CSI information generating sections 17#1 to 17#N provided in association with the transmission antennas of the radio base station apparatus to obtain a CSI measurement value from the signal including the CSI-RS. FIG. 8 shows specifically only the CSI information generating section 17#1 associated with the transmission antenna #1 of the radio base station apparatus.

Each of the CSI information generating sections 17#1 to 17#N is mainly comprised of a multiplexing RB extracting section 171 that extracts the RB to perform shifting and/or hopping on the CSI-RS, a time/frequency demapping section 172 that demaps the CSI-RS mapped in the time domain/frequency domain, and a CSI measuring section 173 that measures the CSI using the demapped CSI-RS.

The signal transmitted from the radio base station apparatus in downlink (Physical Downlink Shared Channel) is received via the reception antenna 11 of the mobile terminal device. The CP removing section 12 removes the CP from the reception signal. The CP removing section 12 outputs the CP-removed signal to the FFT section 13. The FFT section 13 performs FFT on the CP-removed signal to transform into the signal in the frequency domain. The FFT section 13 outputs the FFT-processed signal to the channel dividing section 14. The channel dividing section 14 performs channel-dividing on the shared channel signal and the signal including the CSI-RS. The channel dividing section 14 outputs the signals subjected to channel dividing to the depuncture processing section 15.

The depuncture processing section 15 performs the depuncture processing on the shared channel signal subjected to channel dividing. The depuncture processing section 15 performs the depuncture processing on the shared channel signal based on the number of CSI-RS orthogonal multiplexing ("3" of A to C in the case as shown in FIG. 5) included in the orthogonal resource information (orthogonal resource number). The depuncture processing section 15 outputs the shared channel signal subjected to the depuncture processing to the shared channel signal demodulation/decoding section 16.

The shared channel signal demodulation/decoding section 16 demodulates and decodes the depunctured shared channel signal to obtain reception data.

The multiplexing RB extracting section 171 extracts the RB subjected to shifting and/or hopping from the radio frame. When shifting and/or hopping is performed as the randomization processing, the multiplexing RB extracting section 171 extracts the signal including the CSI-RS from the radio frame based on the shifting number and/or the hopping number. The multiplexing RB extracting section 171 outputs the signal including the CSI-RS subjected to RB extraction to the time/frequency demapping section 172.

The time/frequency demapping section 172 demaps the CSI-RS from the time domain/frequency domain in the RB. In the case of adopting time multiplexing and/or frequency multiplexing as the orthogonalization processing, the time/frequency demapping section 172 performs demapping using the number of orthogonal multiplexing included in the orthogonal resource number. Meanwhile, in the case of adopting shifting and/or hopping as the randomization processing, the time/frequency demapping section 172 demaps the CSI-RS based on the shifting number and/or the hopping number. The time/frequency demapping section 172 outputs the demapped signal to the CSI measuring section 173.

The CSI measuring section 173 measures the channel quality using the demapped (extracted) CSI-RS to output a CSI measurement value. In the case of adopting scrambling as the randomization processing on the CSI-RS, the CSI measuring section 173 descrambles the CSI-RS with the scrambling code based on the scrambling code number to extract. Further, in the case of performing code multiplexing as the orthogonalization processing, the CSI measuring section 173 extracts the CSI-RS using the orthogonal code based on the orthogonal code number and the number of orthogonal multiplexing included in the orthogonal resource number, among the transmission antennas and cells to orthogonalize.

The downlink signal includes control information for randomization and/or control information for orthogonalization. As the control information for randomization, there are the scrambling code number, the shifting number and/or the hopping number. As the control information for orthogonalization, there are the orthogonal resource number including resources to use and the number of orthogonal multiplexing, and the orthogonal code number. Herein, with the description given using FIG. 5(b), the resources to use mean cells (A to C). Accordingly, the resources to use are identification information indicating that the resources to use are of any of A to C in predetermined cell groups 1 to 4.

The control information for randomization and/or control information for orthogonalization may be notified from the radio base station apparatus to the mobile terminal device on the broadcast channel (BCH), may be transmitted as an L1/L2 control signal, or may be notified by a higher layer.

The scrambling code number that is the control information for randomization is output to the CSI measuring section 173, and the shifting number and/or the hopping number is output to the frequency/time demapping section 172 and multiplexing RB extracting section 171. Meanwhile, the orthogonal resource number that is the control information for orthogonalization is output to the CSI measuring section 173 and time/frequency demapping section 172. Further, the orthogonal code number that is the control information for orthogonalization is output to the CSI measuring section 173. Furthermore, the number of CSI-RS orthogonal multiplexing is output to the depuncture processing section 15.

Described is a wireless communication method in the radio base station apparatus and the mobile terminal device having the above-mentioned configurations. In the wireless communication method of the invention, the radio base station apparatus generates CSI-RSs, performs the randomization processing on the CSI-RSs to be mutually non-orthogonal among at least a part of the cells, and orthogonalizes the CSI-RSs among the transmission antennas to transmit to the mobile terminal device together with the control information, and the mobile terminal device receives a downlink signal including the control information and CSI-RS, extracts the CSI-RS using the control information, and measures channel quality using the CSI-RS.

The radio base station apparatus multiplies the CSI-RS by the scrambling code associated with scrambling number, maps a plurality of CSI-RSs to multiplex into different subcarriers among the transmission antennas and a part of the cells and performs orthogonalization (FDM), while mapping so that each CSI-RS does not collide (does not interfere) in the time domain and the frequency domain among the cells and performing randomization (shifting). Meanwhile, with respect to the shared channel signal, the puncture processing is performed so that the CSI-RS does not interfere with the data among the transmission antennas and a part of the cells. The radio base station apparatus performs channel multiplexing on such a shared channel signal and CSI-RS, and transmits the multiplexed signal to the mobile terminal device in downlink. At this point, the randomization control information and orthogonalization control information is also transmitted to the mobile terminal device in downlink.

The mobile terminal device divides into the shared channel signal and CSI-RS, depunctures the shared channel signal to demodulate and decode, and demaps the CSI-RS to extract. Then, the mobile terminal device measures the channel quality using the CSI-RS to obtain a CSI measurement value. Thus, in the wireless communication method of the invention, by performing the randomization processing on CSI-RSs to be mutually non-orthogonal among cells, and mutually orthogonalizing the CSI-RSs among transmission antennas and a part of the cells, it is possible to transmit downlink channel quality measurement reference signals in consideration of orthogonalization among the transmission antennas, orthogonalization among the cells, and interference estimation of high accuracy.

The invention is not limited to the aforementioned Embodiment, and is capable of being carried into practice with various modifications thereof. In the above-mentioned Embodiment, the number of transmission antennas and the number of cells are examples, and the invention is not limited thereto. Further, without departing from the scope of the invention, the number of processing sections and processing procedures in the above-mentioned description are capable of being carried into practice with modifications thereof as appropriate. Furthermore, each element shown in the figures represents the function, and each function block may be actualized by hardware or may be actualized by software. Moreover, the invention is capable of being carried into practice with modifications thereof as appropriate without departing from the scope of the invention.

INDUSTRIAL APPLICABILITY

The invention is useful in the radio base station apparatus, mobile terminal device and wireless communication method in the LTE-A systems.

The present application is based on Japanese Patent Application No. 2010-000773 filed on Jan. 5, 2010, entire content of which is expressly incorporated by reference herein.

The invention claimed is:

1. A radio base station apparatus comprising:
a generation section that generates each of channel quality measurement reference signals using a scrambling code associated with a cell ID;
a mapping section that maps each of the channel quality measurement reference signals to a resource in time and frequency domains based on a shifting number indicative of a shifting pattern; and
a transmission section that performs orthogonalization processing on the channel quality measurement reference signals to be orthogonal among transmission antennas and transmits each of the channel quality measurement reference signals to a mobile terminal device,
wherein the mobile terminal apparatus is notified of the shifting number and a radio resource with no data signal arranged as common control information or dedicated control information, and
the shifting number and the radio resource with no data signal arranged are used as a basis to control transmission of a data signal in the resource in time and frequency domains.

2. The radio base station apparatus according to claim 1, wherein the orthogonalization processing among the transmission antennas is performed by frequency division multiplexing and code division multiplexing.

3. The radio base station apparatus according to claim 2, wherein the shifting number is used as a basis to configure the data signal not to be mapped to the resource in time and frequency domains.

4. The radio base station apparatus according to claim 3, wherein, when orthogonalizing the channel quality measurement reference signals between a serving cell and a different cell, a data signal of the serving cell is not mapped to a resource where a channel quality measurement reference signal of the different cell is arranged.

5. The radio base station apparatus according to claim 1, wherein the shifting number is used as a basis to configure the data signal not to be mapped to the resource in time and frequency domains.

6. The radio base station apparatus according to claim 5, wherein, when orthogonalizing the channel quality measurement reference signals between a serving cell and a different cell, a data signal of the serving cell is not mapped to a resource where a channel quality measurement reference signal of the different cell is arranged.

7. A mobile terminal device comprising:
a reception section that receives a channel quality measurement reference signal that is generated using a scrambling code associated with a cell ID and mapped to a resource in time and frequency domains based on a shifting number indicative of a shifting pattern; and
a measuring section that measures channel quality using the channel quality measurement reference signal, wherein the mobile terminal apparatus is notified of the shifting number and a radio resource with no data signal arranged as common control information or dedicated control information by a radio base station apparatus, and the shifting number and the radio resource with no data signal arranged are used as a basis to control reception of a data signal in the resource in time and frequency domains.

8. The mobile terminal device according to claim 7, wherein the reception section receives orthogonalization control information including a resource to use and the number of orthogonal multiplexing.

9. The mobile terminal device according to claim 8, wherein, when orthogonalizing the channel quality measurement reference signals between a serving cell and a different cell, a data signal of the serving cell is not received in a resource where a channel quality measurement reference signal of the different cell is arranged.

10. The mobile terminal device according to claim 7, wherein, when orthogonalizing the channel quality measurement reference signals between a serving cell and a different cell, a data signal of the serving cell is not received in a resource where a channel quality measurement reference signal of the different cell is arranged.

11. A wireless communication method comprising:
in a radio base station apparatus,
generating each of channel quality measurement reference signals using a scrambling code associated with a cell ID;
mapping each of the channel quality measurement reference signals to a resource in time and frequency domains based on a shifting number indicative of a shifting pattern; and
orthogonalizing the channel quality measurement reference signals among transmission antennas and transmitting each of the channel quality measurement reference signals to a mobile terminal device,
wherein the radio base station apparatus notifies the mobile terminal device of the shifting number and a radio resource with no data signal arranged as common control information or dedicated control information, and
the shifting number and the radio resource with no data signal arranged are used as a basis to control transmission of a data signal in the resource in time and frequency domains.

12. The wireless communication method according to claim 11, further comprising:
in the mobile terminal device,
receiving a downlink signal including the channel quality measurement reference signal; and
measuring channel quality using the channel quality measurement reference signal.

13. The wireless communication method according to claim 12, wherein the orthogonalizing among the transmission antennas is performed by frequency division multiplexing and code division multiplexing.

14. The wireless communication method according to claim 12, wherein the shifting number is used as a basis to configure the data signal not to be mapped to the resource in time and frequency domains.

15. The wireless communication method according to claim 11, wherein the orthogonalizing among the transmission antennas is performed by frequency division multiplexing and code division multiplexing.

16. The wireless communication method according to claim 11, wherein the shifting number is used as a basis to configure the data signal not to be mapped to the resource in time and frequency domains.

17. The wireless communication method according to claim 16, wherein, when orthogonalizing the channel quality measurement reference signals between a serving cell and a different cell, a data signal of the serving cell is not mapped to a resource where a channel quality measurement reference signal of the different cell is arranged.

18. A wireless communication system comprising:
a radio base station apparatus having:
a generation section that generates each of channel quality measurement reference signals using a scrambling code associated with a cell ID;
a mapping section that maps each of the channel quality measurement reference signals to a resource in time and frequency domains based on a shifting number indicative of a shifting pattern; and
a transmission section that performs orthogonalization processing on the channel quality measurement reference signals to be orthogonal among transmission antennas and transmits each of the channel quality measurement reference signals to a mobile terminal device; and
the mobile terminal device having:
a reception section that receives each of the channel quality measurement reference signals; and
a measuring section that measures channel quality using each of the channel quality measurement reference signals,
wherein the radio base station apparatus notifies the mobile terminal device of the shifting number and a radio resource with no data signal arranged as common control information or dedicated control information, and
the shifting number and the radio resource with no data signal arranged are used as a basis to control transmission of a data signal in the resource in time and frequency domains.

* * * * *